E. CARVER.
Cotton Gin Rib.
No. 17.
Reissued Nov. 16, 1839.
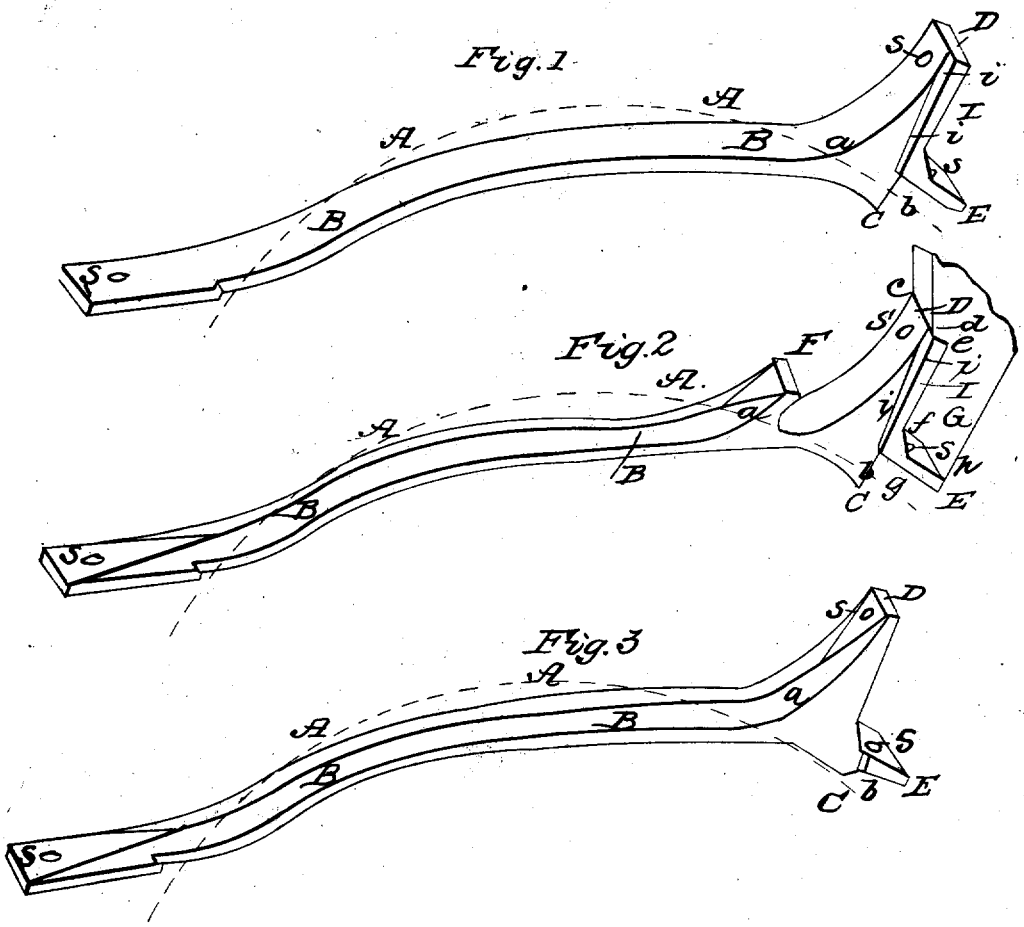
N. PETERS. Photo-Lithographer, Washington, D. C.

UNITED STATES PATENT OFFICE.

ELEAZER CARVER, OF BRIDGEWATER, MASSACHUSETTS.

IMPROVEMENT IN THE RIBS OF SAW-GINS FOR GINNING COTTON.

Specification forming part of Letters Patent No. 777, dated June 12, 1838; reissue No. 17, dated November 16, 1839.

*To all whom it may concern:*

Be it known that I, ELEAZER CARVER, of Bridgewater, in the county of Plymouth and State of Massachusetts, have invented a certain Improvement in the Manner of Forming the Ribs of Saw-Gins for the Ginning of Cotton; and I do hereby declare that the following is a full and exact description thereof.

In the cotton-gin, as heretofore known and used, the fibers of the cotton are drawn by the teeth of circular saws, through a grating formed of a number of parallel bars or ribs, having spaces between them sufficient to allow the saws to pass, carrying the fibers of the cotton with them, (which are then brushed off by a revolving brush,) but not wide enough to let the seeds and other foreign substances pass through. Above the saws the ribs come in close contact, thus forming a shoulder at the top of the space between them. Various forms have been given to the bars or ribs with a view to procure a free passage for the cotton; but the cotton-gin, as heretofore made, has been always subject to the inconvenience of the grate becoming choked by hard masses of cotton and motes or false seeds collecting in the upper part of the spaces between the ribs, and impeding the action of the saws, and also preventing the mass of cotton, which is drawn by the saws up to the top of the spaces, but not drawn through them from rolling back freely so as to pass again over the saws, as it should do.

My improvement, which I am about to describe, is intended to obviate these difficulties; and it consists in giving a new form to the ribs composing the grate. Instead of making the ribs of a bar of iron of equal thickness throughout, so that the upper and under surfaces shall be parallel, I so form the rib that at the part where the saws pass through, carrying the cotton with them, the space or depth between the upper or outer surface and the lower or inner surface shall be greater than the thickness of the rib in other parts has heretofore been or needs to be, and so great as to be equal to the length of the fiber of the cotton to be ginned, so that the fiber shall be kept extended between the ribs for about its full length, while it is drawn through them by the saws. This will of course require either that the rib should be as thick at that part as the length of the fiber, or that the rib should be forked or divided about that part, so that the upper or outer surface, and the under or inner surface, shall diverge to that distance from each other, instead of being parallel as formerly when the rib was made of one bar of uniform thickness. This under or inner surface then takes a new direction upward, and slopes toward the upper or outward surface until the two surfaces meet above the periphery of the saw. This last-described part of the under surface is fastened against the framework of the gin.

The operation of this improvement is that those fibers of the cotton, which are so firmly caught by the teeth of the saws as to be disengaged from the mass of the cotton to be ginned, are drawn out to their full length, and pass clear through the grate, and are then brushed off by the revolving brush, while the fibers that are drawn into the grate, but are not caught by the teeth of the saws firmly enough to be carried quite through, are disengaged, and pass up to the point where the under surface meets the upper surface above the saws, and, finding no obstruction there, pass back out of the grate without choking it, and roll down again with the mass of unginned cotton, and are then caught below by the saws and carried up again, and so on, until all the fibers are drawn through.

I will now describe my improved rib by reference to the annexed drawings.

Figures 1, 2, and 3 are perspective views of three different forms of my said improvement. In all of them the dotted line A A represents a segment of the periphery of the saw. B B is the upper surface of the rib—the under surface is not seen in this view. *a* to *b* is the increased distance of the upper and under surfaces where the cotton is drawn through by the saws. In Figs. 1 and 3 this is produced by the greater thickness merely of the ribs in that part. In Fig. 2 it is still further increased by a fork or division of the rib produced by the projection F. From C to D the under surface takes a new direction upward, and slopes toward the upper surface. E is a shelf, which is only for the purpose of fastening the rib to the under side of the frame-work of the gin.

I, in Figs. 1 and 2, is a lateral projection equal to the space between the ribs, which meets the adjoining rib, and tends to keep both firmly in their places, and also affords a smooth metallic surface, *i i*, for the cotton, which escapes from the teeth of the saw without being carried clear through the grate, to rise against as it passes out, which is better than to have it rise against the wooden frame-work of the gin, as it would if it were made, like Fig. 3, without the projection I; but this is not essential to my improvement.

Fig. 2 shows the mode of inserting and fastening the rib into the wooden frame-work of the gin. G is a section of a fragment of the frame. *c d e f g h* show the junction of the upper and back part of the rib with the frame, by which the upper surface of the rib and the wooden frame-work make one continuous surface at D, with an unobstructed passage between the ribs at *i i* for those fibers of the cotton to pass up and out of the grate, which the saws do not succeed in carrying quite through. The rib is fastened to the frame-work of the gin by screws at *s s s*.

Having thus described my improved rib and its advantages, I now claim as my invention, and desire to secure by Letters Patent—

1. The increasing the depth or space between the upper or outer surface of the rib, and the lower or inner surface of it, at the part where the cotton is drawn through the grate, so that it shall be equal to the length of the fiber of the cotton to be ginned, (whether this be done by making the ribs thicker at that part, or by a fork or division of the rib, or by any other variation of the particular form.)

2. As part of the same improvement, the sloping up of the lower or inner surface of the rib, so as to meet the upper or outer surface above the saws, leaving, when the rib is inserted into the frame, no break or shoulder between the two surfaces, but a smooth and uninterrupted passage upward between the ribs, as above described.

ELEAZER CARVER.

Witnesses:
ARTEMAS HALE,
SAMUEL LEONARD, Jr.